3,091,566
INSECTICIDAL COMPOSITIONS CONTAINING POLYOXYALKYLENE GLYCOL MONOETHERS OF PHENOLIC DERIVATIVES OF HALOCYCLOALKANES
Louis Schmerling, Riverside, and Herman S. Bloch, Skokie, Ill., assignors to Universal Oil Products Company, Des Plaines, Ill., a corporation of Delaware
No Drawing. Filed Apr. 26, 1961, Ser. No. 105,562
6 Claims. (Cl. 167—30)

This application is a continuation-in-part of our copending application Serial No. 692,006, filed October 23, 1957, now abandoned.

This invention relates to new compositions of matter and to a method for the preparation thereof. More specifically the invention relates to a method for preparing polyoxyalkylene glycol monoethers of a phenolic derivative of a halocycloalkene.

Insecticidal compositions which are soluble in water and, in addition, are surface-active agents have many advantages over the conventional type of insecticide. Advantages which may be found in having such an insecticide include the elimination of the need of an emulsifying agent in preparing an aqueous solution of the insecticide as well as a reduction in the cost of the preparation of said solution. Furthermore, the solutions are surface-active and when used in detergent formulations will yield clean surfaces which retain insecticidal properties after the cleansing operation is completed.

Previously reported halogenated insecticides have been water-insoluble and fat-soluble. These insecticides being fat-soluble are believed to be operative through a solution in the fatty tissue of the insect and a subsequent migration to the nervous system, said nervous system being then impaired or destroyed thereby killing the insect. However, as pointed out above, previous halogenated insecticides are not soluble in water and therefore require an additional compound to suspend or solubilize the insecticide so that water may be used to dilute the strength of the active ingredient.

It is therefore an object of this invention to prepare water-soluble surface-active insecticidal compositions.

A further object of this invention is to prepare polyoxyalkylene glycol monoethers of phenolic derivatives of halocycloalkenes.

One embodiment of this invention resides in an aqueous insecticide containing from about 0.01% to about 20% by weight of a compound selected from the group having the generic formulae:

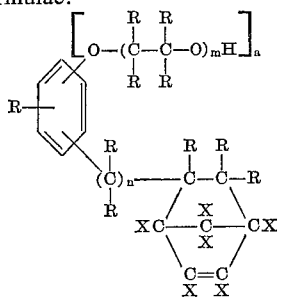

and

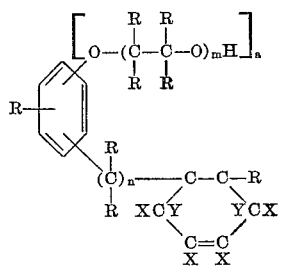

in which the R substituents are separately selected from the group consisting of hydrogen and alkyl radicals containing from 1 to about 6 carbon atoms, the X substituents are separately selected from the group consisting of hydrogen, halogen and alkyl radicals containing from about 1 to about 6 carbon atoms, at least one X being halogen, the Y substituents are separately selected from the group consisting of hydrogen, haloalkyl and alkyl radicals containing from 1 to about 6 carbon atoms, $a$ is a number 1 or 2, $m$ is a number of from 2 to about 20 and $n$ is an integer of from 0 to about 8.

A specific embodiment of this invention is found in an aqueous insecticide containing from about 0.1% to about 5% by weight of 1,3-dichloro-4-[2-(6-hydroxy-1,4-dioxahexyl)benzyl]-1-cyclohexene.

The compounds formed by the process of this invention will find a wide variety of uses in the chemical field especially as insecticides, and more particularly as water-soluble surface-active insecticides. For example, the condensation product which results from the reaction between hexachlorocyclopentadiene and o-allylphenol, followed by condensing the resultant product with two moles of ethylene oxide, namely, 1,2,3,4,7,7-hexachloro-5-[2-(16-hydroxy-1,4-dioxahexyl)benzyl]-2-norbornene is active as an insecticide especially against houseflies. In addition, the reaction products of this invention may also be used as intermediates in the preparation of resins, pharmaceuticals, plastics, etc. For purposes of this invention the term "halocycloalkenes" will refer to monohalocycloalkenes, polyhalocycloalkenes, monohalobicycloalkenes and polyhalobicycloalkenes. In addition, the term "halo" will refer to both mono and polyhalo compounds.

The process of this invention in which the halo substituted conjugated diolefin, either straight chain or cyclic, is condensed with the unsaturated side chain derivative of a phenol takes place at temperatures in the range of from about 20° to about 250° C. and often preferably at a temperature in the range of from about 80° to about 180° C., the reaction temperature being dependent upon the particular reactants which are to be condensed. Generally speaking, the reaction will take place at atmospheric pressure; however, if temperatures above the boiling point of the reaction mixture are to be used when condensing a lower boiling halogenated diene with the unsaturated side chain derivative of the phenol, superatmospheric pressures ranging from about 2 to about 100 atmospheres or more will be used, the amount of pressure used being that necessary to maintain at least a portion of the reactants in the liquid phase. In addition, if so desired, the reaction may take place in the presence of inert organic solvents including aromatic solvents such as benzene, toluene, o-, m- and p-xylene, ethylbenzene, etc., alcohols such as methyl alcohol, ethyl alcohol, propyl alcohol, etc.; ethers such as dimethyl ether, diethyl ether, dipropyl ether, etc., saturated low molecular weight aliphatic hydrocarbons such as pentane, hexane, heptane, etc.; or acetone, acetic acid, etc.

The condensation step between the reaction product of the halo substituted conjugated diene with the unsaturated side chain derivative of the phenol and the alkylene oxide will also be effected at temperatures and pressures similar to those stated in the above paragraph, namely, at temperatures in the range of from about 20° to about 250° C. and at pressures ranging from about atmospheric to about 100 atmospheres or more, both temperature and pressure being dependent upon the particular reactants undergoing condensation.

It is known from the prior art that a cycloalkenic derivative of a phenol may be prepared by condensing an unsaturated hydrocarbon such as an alkadiene or cycloalkadiene with a phenol to prepare the aforementioned cycloalkenic derivatives of phenols, the latter then being etherified by further condensation with a polyalkylene glycol. However, it is also known in the art that the effect on activity of substituents either on the cycloalkenic ring or on the aromatic ring of compounds of the type of the present invention cannot be predicted. Therefore there was no certainty that the presence of halogen atoms, and particularly chlorine atoms or substituents on the cycloalkenic portion of the compound, would result in the formation of water-soluble compounds which also possess insecticidal activity. It is well known that in many instances one halogenated unsaturated compound will not undergo reaction with another reactant, whereas another halogenated unsaturated compound will undergo such reaction. Therefore, inasmuch as the reactions of halogenated alkadienes or halogenated cycloalkadienes with an unsaturated aliphatic side chain derivative of a phenol could not be predicted a careful selection of the components of a molecule required for the preparation of an insecticide is necessary, since it is not yet predictable that any given compound will have insecticidal properties. We have therefore discovered that when utilizing the specific compounds disclosed in the present process, the condensation of such compounds with an unsaturated aliphatic side chain derivative of a phenol will result in the preparation of a water-soluble insecticide, said reaction and the properties of the resultant product being totally unexpected and unpredictable.

The desired water soluble or aqueous insecticide will have the generic formula:

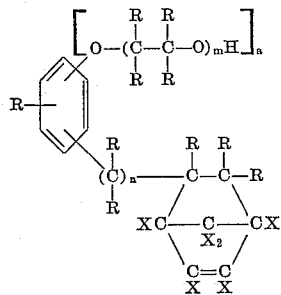

if a halocycloalkadiene is used, or the generic formula:

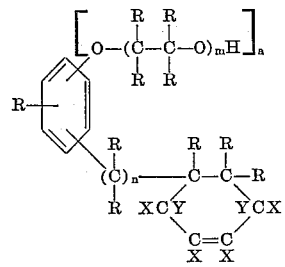

if a haloalkadiene is used. In the above formulas the several R substituents are independently selected from the group consisting of hydrogen and alkyl radicals containing from 1 to about 6 carbon atoms, the several X substituents are independently selected from the group consisting of hydrogen, halogen and alkyl radicals containing from 1 to about 6 carbon atoms, at least one X being halogen, the Y substituents are independently selected from the group consisting of hydrogen, haloalkyl and alkyl radicals, the latter two containing from 1 to about 6 carbon atoms, $a$ is a number 1 or 2, $m$ is a number of from 2 to about 20 and $n$ is an integer of from 0 to about 8. The value of $m$ in the above formulae will depend upon the mole ratio of the alkylene oxide to the condensation product of the reaction between the unsaturated side chain derivative of a phenol and the halocycloalkadiene or haloalkadiene. For example, if $m$ is 2 the mole ratio of alkylene oxide to the aforementioned condensation product is 2:1 and so on as $m$ increases in size.

Unsaturated compounds containing a halogen substituent which may be reacted with the unsaturated side chain derivative of a phenol in the process of the present invention include straight-chain diolefins having the general formula:

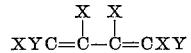

in which X is independently selected from the group consisting of hydrogen, alkyl, or halogen radicals having an atomic weight of from 35 to 127 (i.e. chlorine, bromine or iodine), at least one X being halogen and Y is independently selected from the group consisting of alkyl, haloalkyl, and hydrogen radicals; or polyhalocycloalkadienes having the general formula:

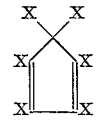

in which X has the same meaning as above. Examples of these compounds include haloalkadienes such as 1-chloro-1,3-butadiene, 1,3-, 2,3- and 1,4-dichloro-1,3-butadiene, 1-bromo-1,3-butadiene, 1,3-, 2,3- and 1,4-dibromo-1,3-butadiene, 1,3-, 2,3- and 1,4-diiodo-1,3-butadiene, 1,2,3-trichloro-1,3-butadiene, 1,2,3-tribromo-1,3-butadiene, 1-oido-1,3-butadiene, 1,2-diiodo-1,3-butadiene, 1,2,3-triiodo-1,3-butadiene, 1,2,4-trichloro-1,3-butadiene, 1,2,4-tribromo-1,3-butadiene, 1,2,4-triiodo-1,3-butadiene, 1,2,3,4-tetrachloro-1,3-butadiene, 1,2,3,4-tetrabromo-1,3-butadiene, 1,2,3,4-tetraiodo-1,3-butadiene, 1,3-dichloro-2-methyl-1,3-butadiene, 1,4-dichloro-2-methyl-1,3-butadiene, 1,3,4-trichloro-2-methyl-1,3-butadiene, 1,4-dichloro-2-chloromethyl-1,3-butadiene, 1,4-dichloro-2-dichloromethyl-1,3-butadiene, 1,3-dibromo-2-methyl-1,3-butadiene, 1,4-dibromo-2-methyl-1,3-butadiene, 1,4-dibromo-2-bromomethyl-1,3-butadiene, 1,4-dibromo-2-dibromomethyl-1,3-butadiene, 1,3,4-tribromo-2-methyl-1,3-butadiene, 1,3-diiodo-2-methyl-1,3-butadiene, 1,4-diiodo-2-methyl-1,3-butadiene, 1,4-diiodo-2-iodomethyl-1,3-butadiene, 1,4-diiodo-2-diiodomethyl-1,3-butadiene, 1,3,4-triiodo-2-methyl-1,3-butadiene, etc.; and halocycloalkadienes such as halogenated 1,3-cyclopentadienes which for purposes of this invention will be designated as halogenated cyclopentadienes including 1-chlorocyclopentadiene, 1,2- and other dichlorocyclopentadienes, 1,2,3- and other trichlorocyclopentadienes, 1,2,3,4- and other tetrachlorocyclopentadienes, 1,2,3,4,5- and other pentachlorocyclopentadienes, hexachlorocyclopentadiene, the corresponding bromo- and iodo-derivatives, etc. It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo-1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadienes, 1-iodo-3-chloro-1,3-butadiene, 2-bromo-3-chloro-1,3-butadiene, 1,4-dichloro-2-bromomethyl-1,3-butadiene, 1,4-dichloro-2-iodomethyl-1,3-butadiene, 1-chloro-2-bromocyclopentadiene, 1,2-dichloro-3-bromocyclopentadiene, 1,2-dichloro-5,5-dibromocyclopentadiene, etc., although not necessarily with equivalent results.

Alkenyl phenols containing only carbon, hydrogen and oxygen substituents in which the unsaturated side chain oxygen is monoolefinic in character, said side chain containing only carbon and hydrogen substituents having the generic formula:

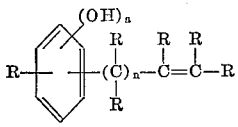

in which the several R groups are independently selected from the group consisting of hydrogen and alkyl radicals, $a$ is 1 or 2, and $n$ is an integer of from 0 to 8 are the preferred compounds for condensation with halogented dienes. Suitable compounds which may be used include o-vinylphenol, m-vinylphenol, p-vinylphenol, o-allylphenol, m-allylphenol, p-allylphenol, o-crotylphenol, m-crotylphenol, p-crotylphenol, o-methallylphenol, m-methallylphenol, p-methallylphenol, o-(4-pentenyl)phenol, the isomeric m-, o- and p-pentenyl, hexenyl, heptenyl, octenyl, nonenyl, and decenyl substituted phenols, etc., 3-vinylcatechol, 3-allylcatechol, 3-methallylcatechol, 3-crotonylcatechol, 4-vinylcatechol, 4-allylcatechol, 4-methallylcatechol, 4-crotonylcatechol, 4-vinylresorcinol, 4-allylresorcinol, 4-methallylresorcinol, 4-crotonylresorcinol, the substituted pentenyl, hexenyl, heptenyl, octenyl, nonenyl, decenyl, etc., catechols and resorcinols, etc., 3-vinyl-o-cresol, 3-allyl-o-cresol, 3-methallyl-o-cresol, 3-crotonly-o-cresol, 4 - vinyl - o-cresol, 4 - allyl-o-cresol, 4-methallyl-o-cresol, 4-crotonyl-o-cresol, 4-vinyl-m-cresol, 4-allyl-m-cresol, 4-methallyl-m-cresol, 4-crotonyl-m-cresol, etc. It is to be understood that the aforementioned phenols containing an unsaturated side chain linkage are only representatives of the class of compounds which may be used and that the process of this invention is not necessarily limited thereto.

Alkylene oxides which may be used in the process of this invention comprise ethylene oxide, 1,2-propylene oxide, 2,3-butylene oxide, 1,2-pentene oxide, 2,3-pentene oxide, etc., the preferred epoxides comprising ethylene oxide and propylene oxide due to their relatively greater availability and lower cost.

The volatility of the insecticides produced according to this invention is, of course, dependent upon their molecular weight and when a product having low volatility is especially desired in a particular application, the molecular weight may be raised both by using relatively high-boiling components in the first step of the present invention and by the choice and number of moles of alkylene oxide used in the second step.

The physical properties of the present polyhalo derivatives of substituted phenolic ethers, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the insect with the poison. The insecticides comprising the compounds of the present invention are thus effective against chewing as well as sucking types of insects. In addition, the compounds may be made sufficiently volatile so that when applied to plant life intended for human consumption, the plants when harvested and after allowing a reasonable time for evaporation of the applied insecticides therefrom as well as removal by rainfall, retain insufficient quantities of the toxicant to prevent use of the plants as food. On the other hand, the compounds may be made of sufficiently limited volatility to be retained on the insect for the time required to accomplish their toxic effects.

If so desired, the insecticides of the present invention may be combined with water or other diluent, said diluent being employed for the specific purpose of reducing the concentration of insecticides to the desired level in specific insecticide formulations. The particular formulation of active components in combination with the solvent or dispersant will depend upon its application. Compositions containing as high as 20% of active component may be preferred in some instances to allow deep penetration of the insecticides, as in the treatment of fibrous material, such as wood, for extinction of particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice of the most desirable concentration and also whether or not the insecticide is dissolved or emulsified in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid as a mist containing suspended quantities of the active component, thus providing a convenient spraying method of applying the insecticide.

The process of this invention may be effected in any suitable manner and may comprise either a batch or a continuous type operation. For example, when a batch type operation is used a quantity of the starting materials comprising an unsaturated side chain derivative of a phenol, the halo substituted alkadiene, or halo substituted cycloalkadiene and, if so desired, an inert organic solvent is placed in a condensation apparatus provided with heating and mixing means. The flask is then heated to the desired temperature and pressure and maintained thereat for a predetermined period of time, at the end of which time the flask and contents thereof are allowed to cool to room temperature. The desired intermediate condensation product is separated from unreacted starting materials and by-products by conventional means such as fractional distillation, crystallization, etc. Alternatively, the unsaturated side chain derivative of a phenol and the solvent, if any, may be heated to the desired reaction temperature and the halo substituted alkadiene or cycloalkadiene may be added gradually. The intermediate condensation product of the aforementioned reaction is then placed in a separate flask or, if so desired, may be returned to the original reaction apparatus and admixed with a molecular excess of alkylene oxide. The flask and contents thereof are then heated to the desired reaction temperature and, as in the first step of the process of this invention, maintained thereat for a suitable residence time. At the end of this time the flask and contents thereof are cooled to room temperature and the desired reaction product, comprising a polyoxyalkylene glycol monoether of a phenolic derivative of a halocycloalkene is separated, purified and recovered by the conventional means hereinbefore set forth.

Another method of effecting the condensation reaction of the present invention is by a continuous type operation. In this type of operation the starting material comprising the unsaturated side chain derivative of the phenol and the halo substituted alkadiene or cycloalkadiene are continuously charged to a reactor which is maintained at the proper operating conditions of temperature and pressure. The reactor may comprise an unpacked vessel or coil or may be lined with an adsorbent packing material such as fire brick, alumina, Berl saddles and the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and continuously charged to a second reactor, while the unreacted starting materials are separated and recharged to the first reactor as a portion of the feed stock. After being charged to the second reactor the intermediate condensation product is condensed with an alkylene oxide which is continuously charged through a separate line to the second reactor. The latter is also maintained at suitable operating conditions of temperature and pressure. The desired condensation product, comprising the polyoxyalkylene glycol monoether of a phenolic derivative of a halocycloalkene is separated and purified by means similar to those hereinbefore set forth.

Examples of water-soluble, surface-active insecticides which may be prepared according to this invention include
1,3-dichloro-4-[2-(6-hydroxy-1,4-dioxahexyl)benzyl]-1-cyclohexene,
1,2,3-trichloro-4-[2-(6-hydroxy-1,4-dioxahexyl)benzyl]-1-cyclohexene,
1,3-dichloro-4-[3-methyl-4-(6-hydroxy-1,4-dioxahexyl)-benzyl]-1-cyclohexene,
1,2,3-trichloro-4-[3-methyl-4-(6-hydroxy-1,4-dioxahexyl)-benzyl]-1-cyclohexene,
1,3-dibromo-4-[3-methyl-4-(6-hydroxy-1,4-dioxahexyl)-benzyl]-1-cyclohexene,
1,2,3-tribromo-4-[3-methyl-4-(6-hydroxy-1,4-dioxahexyl)-benzyl]-1-cyclohexene,
1,2,3,4,7,7-hexachloro-5-[2-(6-hydroxy-1,4-dioxahexyl)-phenyl]-2-norbornene,
1,2,3,4,7,7-hexachloro-5-[2-(6-hydroxy-1,4-dioxahexyl)-benzyl]-2-norbornene,
1,2,3,4,7,7-hexabromo-5-[2-(6-hydroxy-1,4-dioxahexyl)-phenyl]-2-norbornene,
1,2,3,4,7,7-hexabromo-2-[2-(6-hydroxy-1,4-dioxahexyl)-benzyl]-2-norbornene, etc.

As in the case of the aforementioned reactants the above insecticides are only examples of the class of compounds which may be prepared, and the present invention is not necessarily limited thereto.

The following examples are given to illustrate the process of the present invention which, however, are not intended to limit the generally broad scope of the present invention in strict accordance therewith.

*Example I*

A solution of 9.0 g. (0.067 mole) of a-allylphenol and 18.3 g. (0.067 mole) of hexachlorocyclopentadiene in about 50 g. of toluene is heated under reflux at 120° C. for about 20 minutes after which the toluene is gradually distilled off permitting the solution temperature to rise. After 45 g. of toluene has been removed during a period of 2 hours, the temperature will rise to 173° C. The solution which is now dark amber is heated for an additional 30 minutes without further removal of toluene. Removal of an additional 3 g. of toluene then causes the final temperature to reach 190° C. The product is allowed to cool after which it is taken up in pentane, washed with dilute aqueous sodium bicarbonate and water, dried and fractionally distilled at reduced temperature. The desired product, comprising 1,2,3,4,7,7-hexachloro-5-(2-hydroxybenzyl)-2-norbornene boiling at 184–188° C. at about 1.1 mm. pressure is separated therefrom.

A molecular proportion of the norbornene and 2 molecular proportions of ethylene oxide are placed in a reaction vessel and heated to a temperature of about 125° C. in the presence of 0.7 g. of sodium acetate. The flask and contents thereof are maintained at this temperature for a period of about 1.5 hours at the end of which time they are allowed to cool to room temperature. The reaction product is washed with water, then with pentane, dried and fractionally distilled at reduced pressure, the desired product, comprising 1,2,3,4,7,7-hexachloro-5-[2-(6-hydroxy-1,4-dioxahexyl)benzyl] - 2 - norbornene being separated therefrom.

*Example II*

A solution of 12.3 g. of 1,3-dichloro-1,3-butadiene and 13.4 g. of o-allylphenol in 50 g. of benzene is heated under reflux for about 6 hours after which the product, comprising 1,3-dichloro-4-(2-hydroxybenzyl)-1-cyclohexene is recovered and treated as described in Example I above. One molecular proportion of the cyclohexene is reacted with 2 molecular proportions of ethylene oxide as hereinbefore described and the desired condensation product, comprising 1,3-dichloro-4-[2-(6-hydroxy-1,4-dioxahexyl)-benzyl]-1-cyclohexene is separated and recovered.

*Example III*

A solution of 15.8 g. of 1,2,3-trichloro-1,3-butadiene and 13.4 g. of p-allylphenol in 50 g. of xylene is heated under reflux for a period of about 6 hours after which the product is recovered in a manner similar to that set forth in Examples I and II above. The condensation product comprising 1,2,3-trichloro-4-(4-hydroxybenzyl)-1-cyclohexene is recovered and reacted with 8 molecular proportions of ethylene oxide per molecular proportion of the cyclohexene. The desired product, comprising 1,2,3-trichloro-4-[4-(24 - hydroxy - 1,4,7,10,13,16,19,22-octaoxatetracosyl)benzyl]-1-cyclohexene is separated and recovered by conventional means.

*Example IV*

A mixture of o-vinylphenol and hexachlorocyclopentadiene in a 1:1 mole ratio is refluxed in benzene in a manner similar to that described in Example I. The reaction product, comprising 1,2,3,4,7,7-hexachloro-5-(2-hydroxyphenyl)-2-norbornene is recovered and reacted with ethylene oxide in a mol ratio of 2 moles of ethylene oxide per mole of norbornene. The desired product, comprising 1,2,3,4,7,7-hexachloro-5[2-(6-hydroxy-1,4-dioxahexyl)phenyl]-2-norbornene is separated and recovered.

*Example V*

An insecticidal solution is prepared by dissolving 1 g. of 1,2,3,4,7,7-hexachloro-5-[2-(6-hydroxy-1,4-dioxahexyl)benzyl]-2-norbornene in 2 cc. of benzene and adding 100 cc. of water, the above named compound being dispersible therein. This solution is sprayed into a cage containing common houseflies and causes a 100% knock-down.

Similar tests with the other insecticides of Examples II to IV show that these compounds, like those of Example I, exhibit superior knock-down ability with essentially equal killing power as compared with other insecticides containing only halogen substituents.

We claim as our invention:

1. An aqueous insecticide containing from about 0.01% to about 20% by weight of a compound selected from the group having the generic formulae:

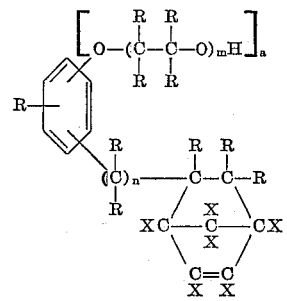

and

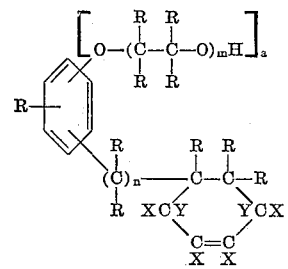

in which the R substituents are independently selected from the group consisting of hydrogen and alkyl radicals containing from 1 to about 6 carbon atoms, the X substituents are independently selected from the group consisting of hydrogen, halogen and alkyl radicals containing from about 1 to about 6 carbon atoms, at least one X being halogen, the Y substituents are independently selected from the group consisting of hydrogen, haloalkyl and alkyl radicals containing from 1 to about 6 carbon atoms, $a$ is an integer from 1 to 2, $m$ is a number of from 2 to about 20 and $n$ is an integer of from 0 to about 8.

2. An aqueous insecticide containing from about 0.1% to about 5% by weight of 1,3-dichloro-4-[2-(6-hydroxy-1,4-dioxahexyl)benzyl]-1-cyclohexene.

3. An aqueous insecticide containing from about 0.1% to about 5% by weight of 1,2,3-trichloro-4-[4-(24-hydroxy - 1,4,7,10,13,19,22 - octaoxatetracosyl)phenyl] - 1-cyclohexene.

4. An aqueous insecticide containing from about 0.1% to about 5% by weight of 1,2,3,4,7,7-hexachloro-4-[2-(6-hydroxy-1,4-dioxahexyl)phenyl]-2-norbornene.

5. An aqueous insecticide containing from about 0.1% to about 5% by weight of 1,2,3,4,7,7-hexachloro-5-[2-(6-hydroxy-1,4-dioxahexyl)benzyl]-2-norbornene.

6. An aqueous insecticide containing from about 0.1% to about 5% by weight of 1,2,3,4,7,7-hexachloro-5-[3-methyl - 4 - (6 - hydroxy - 1,4 - dioxahexyl)benzyl] - 2-norbornene.

References Cited in the file of this patent

UNITED STATES PATENTS

| | | |
|---|---|---|
| 2,492,266 | Buntin | Dec. 27, 1949 |
| 2,616,930 | Schmerling | Nov. 4, 1952 |
| 2,657,166 | Stonecipher | Oct. 27, 1953 |
| 2,734,867 | Weissberg et al. | Feb. 14, 1956 |
| 2,797,248 | Kundinger et al. | June 25, 1957 |
| 2,799,614 | Mark | July 16, 1957 |
| 2,894,993 | Schmerling | July 14, 1959 |